United States Patent [19]

Coon et al.

[11] 4,281,239

[45] Jul. 28, 1981

[54] TIMING APPARATUS AND METHOD

[75] Inventors: Michael D. Coon, Mesa; Martin K. Grace, Scottsdale; Steven R. Smith, Mesa, all of Ariz.

[73] Assignee: Motorola Inc., Schaumburg, Ill.

[21] Appl. No.: 59,815

[22] Filed: Jul. 23, 1979

[51] Int. Cl.³ ............................................. G06M 3/08
[52] U.S. Cl. .......................... 235/92 GA; 235/92 CC; 235/92 PE; 343/13 R
[58] Field of Search ............ 235/92 CC, 92 PE, 92 T, 235/92 GA, 92 CA, 92 FQ, 12 PL; 343/12 R, 12 MD, 13 R; 368/14; 364/460

[56] References Cited

U.S. PATENT DOCUMENTS

| | | | |
|---|---|---|---|
| 3,226,713 | 12/1965 | Sorkin et al. | 343/9 |
| 3,241,063 | 3/1966 | Beattie et al. | 235/92 T |
| 3,277,473 | 10/1966 | Calhoon et al. | 343/13 |
| 3,333,264 | 7/1967 | Knepper | 343/12 |
| 3,496,562 | 2/1970 | Smith | 235/92 PE |
| 3,801,917 | 4/1974 | Weinstein | 343/13 R |
| 3,808,407 | 4/1974 | Ratz | 235/92 CC |

Primary Examiner—Joseph M. Thesz
Attorney, Agent, or Firm—Eugene A. Parsons

[57] ABSTRACT

In a projectile scoring system including a transmitter for illuminating the projectile and a plurality of spaced apart sensors providing signals indicative of the time of arrival of the reflected energy at each of the sensors, timing apparatus including counters activated by the sensor signals and deactivated simultaneously at a predetermined later time. The differences between the counts being utilized in a computer to calculate the position of the projectile relative to the sensors.

8 Claims, 5 Drawing Figures

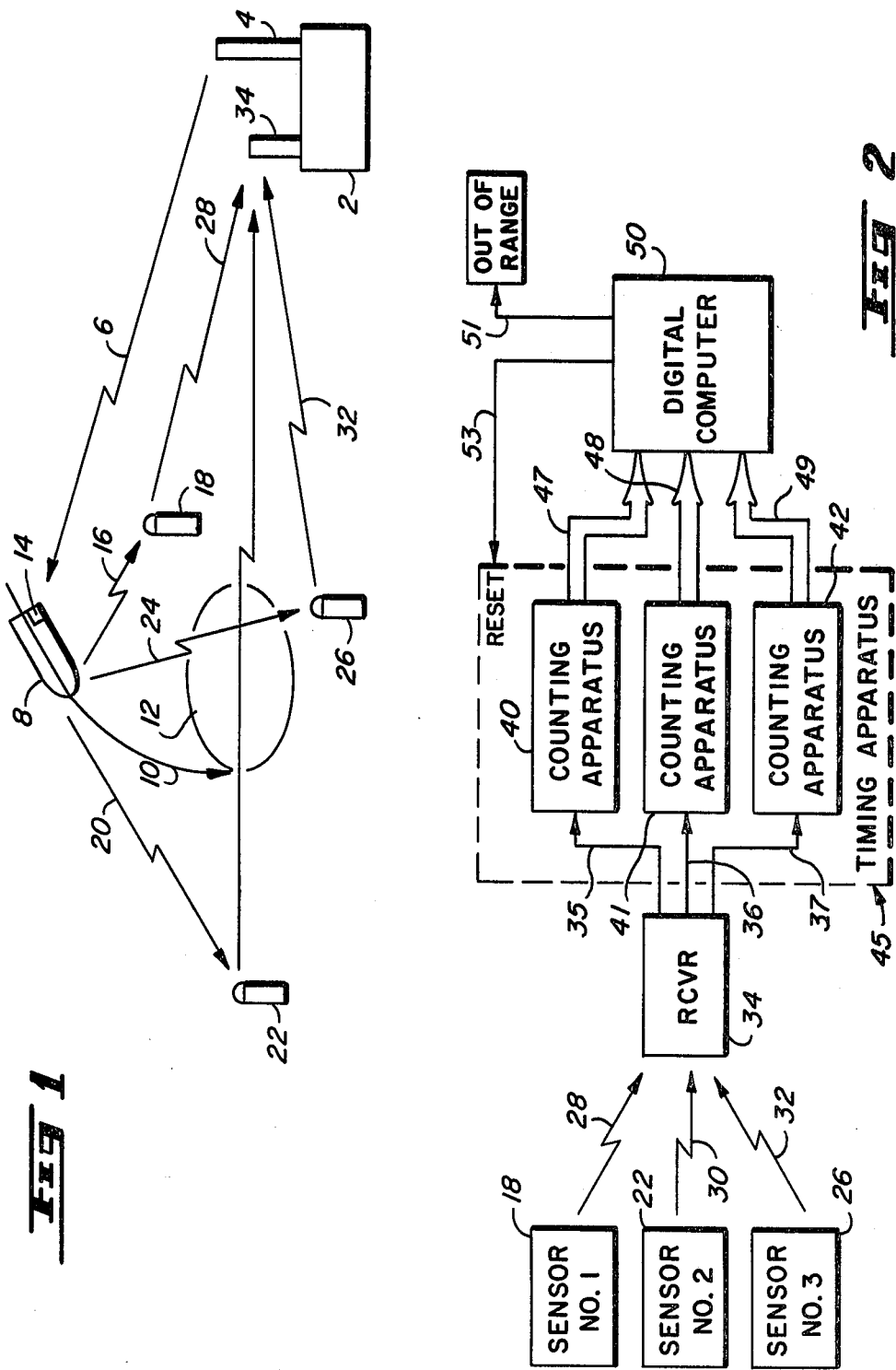

TIMING APPARATUS AND METHOD

BACKGROUND OF THE INVENTION

Apparatus and methods for positioning vehicles and the like by triangulation are well known in the art, see for example U.S. Pat. Nos. 3,665,464, issued May 23, 1972, entitled "Method and Apparatus For High Speed Vehicle Position Acquisition," 3,766,552, issued Oct. 16, 1973, entitled "Unified Area Surveillance, Communication and Mobile Station Guidance System," 4,031,535, issued June 21, 1977, entitled "Multiple Frequency Navigation Radar System." Also, projectile scoring systems of the type including a transmitter for illuminating the projectile and a plurality of spaced apart sensors receiving reflected energy from the projectile and connected to provide signals indicative of the time of arrival of the reflected energy at each of the sensors to a computer designed to calculate the position of the projectile relative to the sensors are known.

Timing apparatus utilized in prior art projectile scoring system are constructed to time intervals between sensor signals by means of counting pulses having a constant repetition rate. In all of the prior art systems the counters are started simultaneously by the occurrence of some predetermined event and each of the counters associated with each sensor is stopped when a signal is received from the sensor. Thus, any overrun in the counter causes an error in the system. Further, the counting apparatus is relatively complicated and it is difficult to provide an indication when a projectile falls outside of a predetermined target area.

SUMMARY OF THE INVENTION

The present invention pertains to timing apparatus for measuring the time difference between the occurrence of a plurality of condition responses, such as signals from sensors in a projectile scoring system, the apparatus including a source of constant repetition rate pulses, a plurality of counters, one associated with each condition response or sensor, switching means for enabling each counter at the occurrence of the associated condition response and gate means for deactivating all of the counters simultaneously upon the first counter to be activated reaching a predetermined count. The system senses if any of the counters has not started when the first counter is deactivated and provides an indication, for example, that the projectile is out of range.

It is an object of the present invention to provide new and improved timing apparatus and method.

It is a further object of the present invention to provide new and improved timing apparatus which is substantially simplified and independent of device delay tolerances.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 illustrates a projectile scoring system;

FIG. 2 illustrates a simplified block diagram of the projectile scoring system of FIG. 1 and embodying the present invention;

DESCRIPTION OF THE PREFERRED EMBODIMENT

Figure 3:
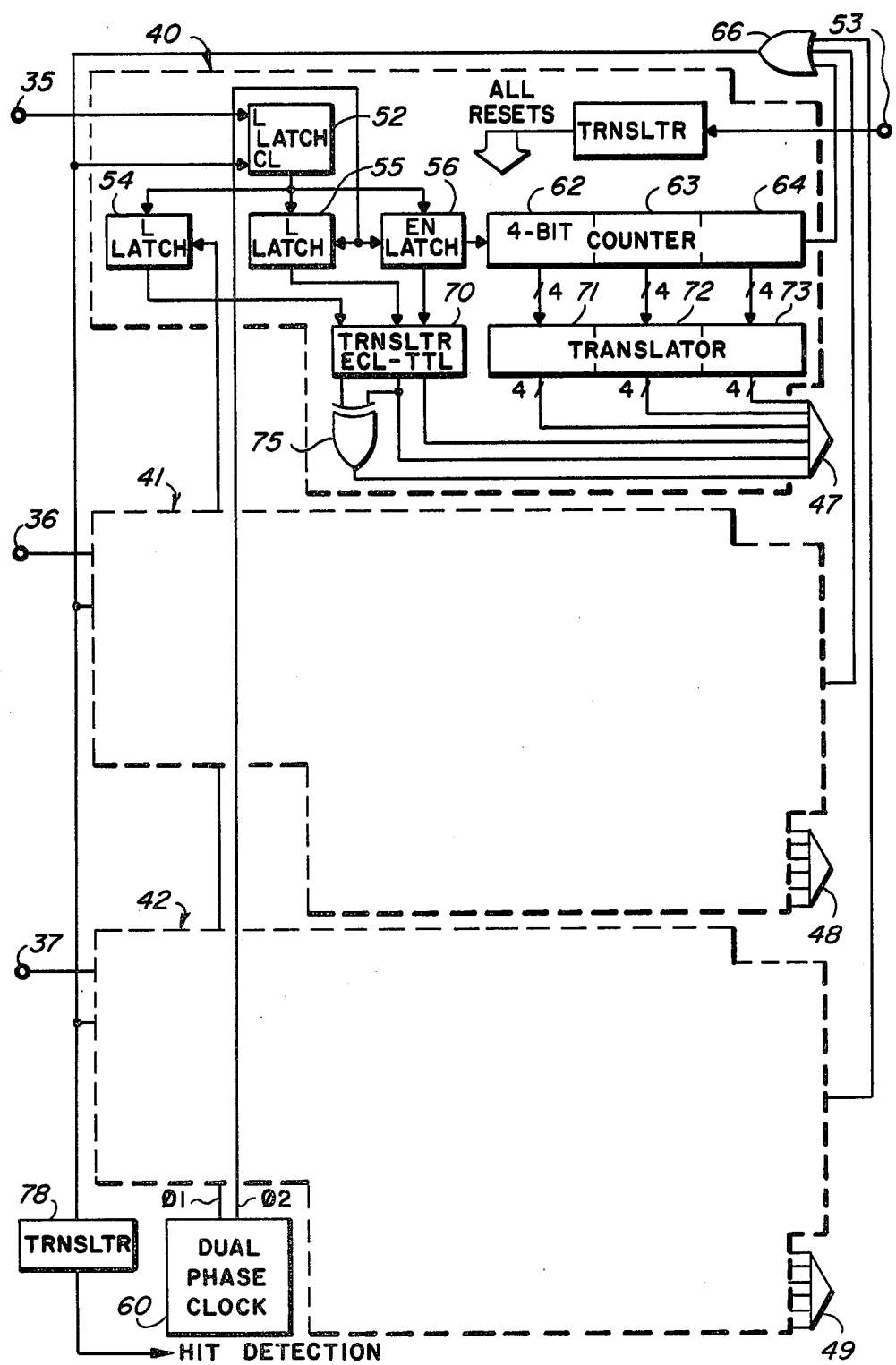
FIG. 3 is a detailed block diagram of the timing apparatus portion of FIG. 2.

The novel timing apparatus disclosed herein may be incorporated, for example, into a system such as that shown in FIG. 1. FIG. 1 is representative of an ordinance accuracy, or projectile, scoring system. An observation building 2 houses a radar transmitter 4. Projectile 8 travels on a ballistic path 10 in an effort to impact a target area 12. The projectile 8 receives a signal 6 from the transmitter 4 at a reflector 14 and reflects the signal along paths 16, 20 and 24 to spaced apart sensors 18, 22 and 26, respectively. As the reflected signal is received in each of the sensors 18, 22 and 26, a signal indicative of the time of arrival of the reflected signal, designated 28, 30 and 32 respectively, is sent to a receiver 34 at the building 2. Each of the signals 28, 30 and 32 are frequency channelized to indicate the sensor initiating the signal. While signals are simply reflected from the projectile 8 in this disclosure, it will be apparent to those skilled in the art that the reflector 14 on the projectile 8 might also be a repeater which receives and retransmits signals. Also, many other variations of the scoring system described might be incorporated by those skilled in the art and it should be understood that this scoring system is only utilized to facilitate the description of the novel timing apparatus.

Referring to FIG. 2, the receiver 34 separates the signals 28, 30 and 32 from the sensors 18, 22 and 26 into signals on three separate lines 35, 36 and 37, respectively. The lines 35, 36 and 37 convey the sensor signals to counting apparatus 40, 41 and 42, respectively, within timing apparatus, generally designated 45. The timing apparatus 45 provides three signals, in digital form, representative of the time interval between the reception of the reflected signal at the sensors 18, 22 or 26 and the simultaneous deactivation of all of the counters. These digital signals are conveyed over three 16 line buses 47, 48 and 49, respectively, to a digital computer 50. The digital computer 50 will not be elaborated upon in this disclosure since the triangulation calculations are well known to those skilled in the art and such additional description would only unduly complicate the present disclosure. A line 51 is connected from the digital computer 50 to an out-of-range indicator, which provides an indication whenever one of the counting apparatus 40, 41 or 42 has stopped counting before the remaining counting apparatus have started. While 16 bits are conveyed from each of the counting apparatus 40, 41 and 42 to the computer 50 in the present disclosure, it will be understood by those skilled in the art after a complete description of the operation of the present apparatus that more or less bits might be utilized if desired.

Referring specifically to FIG. 3, the timing apparatus 45 of FIG. 2 is illustrated in detail. The three input lines 35, 36 and 37 carrying the sensor signals from the receiver 34 are illustrated at the left of FIG. 3 and each is connected to similar counting apparatus so that only one counting apparatus 40 will be described in detail. The input lead 35 is connected to the latching input of a latch circuit 52, the output of which is connected to the latching inputs of a latch circuit 54 and a latch circuit 55 and to an enable input of a latch circuit 56. Each of the latch circuits 52, 54, 55 and 56 may be, for example, a 11C70 Master Slave D Flip-Flop, manufactured by Fairchild Camera and Instrument Corporation. In this embodiment a dual phase clock 60 operates as a source of pulses with a constant repetition rate. The clock 60 provides two outputs, which are similar but 90° apart in phase, with the first output, designated $\phi_1$, being connected to the input of the latch 54 and the second output, designated $\phi_2$, being connected to the inputs of the latches 55 and 56. The latches 54 and 55 are latched with the two phases of the clock 60 and the latch 56 is enabled by the output of the latch 52 to start counting with the second output of the clock 60. The latch 56 operates as the first stage of a thirteen stage counter, the other twelve being supplied by three 4 bit counters 62, 63 and 64. The thirteen stages of counter are connected to operate as a standard binary ripple counter with the output of the final stage in counter 64 being connected to one input of an OR gate 66. An output from each stage of the counter is also connected through an ECL to TTL translator 70, 71, 72 and 73, respectively. The translators 70 through 73 may be, for example, an MC10525 manufactured by Motorola, Inc. The two outputs of the latch circuits 54 and 55 are also applied through the translator 70 to two inputs of an exclusive OR gate 75. The output of the exclusive OR gate 75 the output of the latch circuit 55, after passing through the translator 70, and the outputs of the thirteen stages of the counter 56, 62, 63 and 64 are applied through the bus 47 to the digital computer 50 (see FIG. 2). The output of the last stage of each of the other two counters (counting apparatus 41 and 42) are applied to the OR gate 66 and the output thereof is applied to a "clear" input of the latch 52 to clear the latch circuit 52 and deactivate the counter. Simultaneously, the output of the OR gate 66 is applied to deactivate the counting apparatus 41 and 42. This signal is also supplied through a translator 78 to the digital computer 50 to indicate that the counting has stopped and a computation can be performed. After all counters have been read by the computer 50 a reset signal is sent back to the counters on the line 53.

Figures 4, 5:
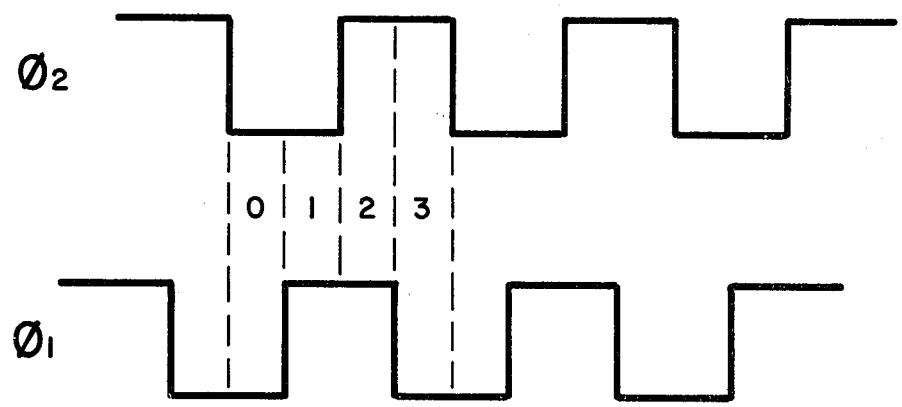
FIG. 4 is a timing diagram of two waveforms present in the apparatus of FIG. 3.
FIG. 5 is a conversion table of the phases of the two waveforms illustrated in FIG. 4 to digital equivalents.

The dual phase clock 60 along with latches 54 and 55 are utilized to lower the actual clock rate while providing, effectively, four times the clock frequency. For example, to provide a resolution of one foot of distance in the scoring system an oscillator operating at a frequency of 983.565 megahertz would be required. However, a much lower frequency is desirable in order to avoid the design problems inherent in such high speed logic circuits. A 491.782 megahertz clock rate will provide the desired resolution if the clock level is used as the least significant bit (LSB). If the two phase clock 60 is employed, a clock rate of approximately 246 megahertz can be used to yield the same resolution. The two phases of the clock 60 are set 90° apart, as illustrated in FIG. 4. By observing the state of both clocks, the two least significant bits can be determined, as shown in the two right hand columns of FIG. 5. The output phases of the clock 60 are not in binary form and must, therefore, be converted into a binary representation. This is done by using the exclusive OR gate 75 on the two phases and using the result as the least significant bit. The least significant bit plus 1 (final column of FIG. 5) is the output of latch circuit 55 after it passes through the translator 70. The least significant bit from the exclusive OR gate 75 and the least significant bit plus 1 are supplied to the computer 50.

In the operation of the timing apparatus illustrated in FIGS. 2 and 3, each of the counting apparatus 40, 41 and 42 is enabled by a signal from the associated sensor 18, 22 and 26, respectively, and counts for a predetermined period of time. In the present embodiment, when the final stage of the counter in the counting apparatus 40, 41 or 42 operates a signal is applied to the OR gate 66 which deactivates the counting apparatus (by clearing the initial latch circuit 52, etc.) and thereby stops all of the counters simultaneously. Since all of the counters are counting at the same rate (pulses from clock 60) the first counter to be enabled by a signal from its associated sensor will be the first clock to complete the predetermined count. Since all counters are stopped simultaneously, the difference of the time of arrival of the sensor signals is preserved. In this embodiment, the first counter to begin counting will reach the predetermined count and try to change all of the stages to zero to set the most significant bit high and supply a signal to the OR gate 66. However, due to the ripple effect in a counter it will take several clock pulses before the counter changes the most significant bit high and, all of the counters continue to count during these several clock pulses. Delays in the deactivating circuitry may also allow another count or two before the counters are actually deactivated. However, because the counters are all deactivated simultaneously these additional counts due to the ripple effect and delays in the circuitry will have no effect on the final count supplied to the computer 50. Thus, as long as the delays for each sensor path are the same errors due to delays and ripple effects in the counters are minimized or eliminated.

The maximum count selected is determined by the radius of the target area 12 and the worst case is when the projectile 8 lands on the periphery of the target 12 adjacent one of the sensors 18, 22 or 26. In this case the first counter to receive an enabling signal must count long enough for the remaining two sensors to suppy an enabling signal to the remaining two counters. Since each count in a counter represents approximately one foot of target, a desired predetermined count can quickly be calculated. Further, whenever the predetermined count is reached in one of the counters before any one of the remaining counters has started an indication of target miss will quickly be discerned in the computer 50 by the lack of count on one of the buses 47, 48 or 49. A signal can then be sent to the out-of-range indicator on the line 51. It will of course be understood that a plurality of readings will be taken just prior to contact of the projectile 8 with the target area 12 and these readings will generally be stored and operated on by the computer 50 to indicate the exact position of the hit.

Thus, improved timing apparatus is disclosed which eliminates errors caused by delays and ripple effects in the system and which utilizes substantially simplified circuitry and the like. While we have shown and described a specific embodiment of this invention, further modifications and improvements will occur to those skilled in the art. We desire it to be understood, therefore, that this invention is not limited to the particular form shown and we intend in the appended claims to cover all modification which do not depart from the spirit and scope of this invention.

We claim:

1. In a projectile scoring system of the type including a transmitter for illuminating the projectile and a plurality of spaced apart sensors receiving reflected energy from the projectile and connected to provide signals indicative of the reflected energy at each of the sensors to a computer designed to calculate the position of the projectile relative to the sensors, improved timing apparatus comprising:

(a) a clock pulse generator;
(b) a plurality of counters, one associated with each sensor, each having an input coupled to said clock pulse generator for receiving pulses thereon and an input adapted to be connected to the computer, and each counter being constructed to provide a pulse at a second output when a predetermined count is reached;
(c) gate means connected to the second output of each of said counters and providing a pulse at an output thereof when a first pulse from one of said counters is received; and
(d) switching means connected to said plurality of counters and adapted to be coupled to the sensors for enabling each of said counters in response to a signal from the associated sensor, said switching means further being connected to said gate means for receiving the output pulse therefrom and deactivating all of said counters simultaneously.

2. Improved timing apparatus as claimed in claim 1 wherein the gate means includes an OR gate.

3. Improved timing apparatus as claimed in claim 1 wherein the counters are constructed so that the predetermined count occurs with the switching of the most significant bit.

4. Improved timing apparatus as claimed in claim 1 wherein the counters are binary ripple counters.

5. Timing apparatus for measuring the time difference between the occurrence of a plurality of condition responses comprising:

(a) pulse producing means for producing an output pulse for each condition response occurrence;
(b) a clock pulse generator;
(c) a plurality of counters, one associated with each condition response, each having an input coupled to said clock pulse generator for receiving pulses thereon and an output, and each counter constructed to provide a pulse at a second output when a predetermined count is reached;
(d) gate means connected to the second output of each of said counters and providing a pulse at an output thereof when a first pulse from one of said counters is received; and
(e) switching means connected to said plurality of counters and the pulse producing means for enabling each of said counters in response to the output pulse for the associated condition response, said switching means further being connected to said gate means for receiving the output pulse therefrom and deactivating all of said counters simultaneously.

6. A method of timing intervals between a plurality of condition responses comprising the steps of:

(a) providing a source of pulses at a constant repetition rate;
(b) counting the pulses from the occurrence of a first condition response to a predetermined number of pulses;
(c) counting the pulses from the occurrence of each of the other condition responses;
(d) stopping all of the counting upon the first count reaching the predetermined number and simultaneously triggering a reading and storing of the counts; and
(e) utilizing the differences between the counts to determine the intervals between occurrences of the condition response.

7. In a projectile scoring system of the type including a transmitter for illuminating the projectile and a plurality of spaced apart sensors receiving reflected energy from the projectile and connected to provide signals indicative of the time of arrival of the reflected energy at each of the sensors to a computer designed to calculate the position of the projectile relative to the sensors, a method of timing intervals between the time of arrival of the reflected energy at the sensors comprising the steps of:

(a) providing a source of pulses at a constant repetition rate;
(b) counting the pulses from the occurrence of a first sensor signal to a predetermined number of pulses;
(c) counting the pulses from the occurrence of each of the other sensor signals;
(d) stopping all of the counting upon the first count reaching the predetermined number and simultaneously triggering a reading and storing of the counts; and
(e) utilizing the difference between the counts to determine the intervals between occurrences of the sensor signals.

8. A method of timing intervals as claimed in claim 7 including the step of providing an out-of-range indication whenever the first counting step is completed before all of the other counting steps are started.

* * * * *